United States Patent
Gorsuch et al.

(10) Patent No.: US 6,526,281 B1
(45) Date of Patent: *Feb. 25, 2003

(54) DYNAMIC BANDWIDTH ALLOCATION TO TRANSMIT A WIRELESS PROTOCOL ACROSS A CODE DIVISION MULTIPLE ACCESS (CDMA) RADIO LINK

(75) Inventors: Thomas E. Gorsuch, Indialantic, FL (US); Carlo Amalfitano, Melbourne Beach, FL (US)

(73) Assignee: Tantivy Communications, Inc., Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/596,425

(22) Filed: Jun. 19, 2000

Related U.S. Application Data (63) Continuation of application No. 08/992,760, filed on Dec. 17, 1997, now Pat. No. 6,081,536.
(60) Provisional application No. 60/050,338, filed on Jun. 20, 1997, and provisional application No. 60/050,277, filed on Jun. 20, 1997.

(51) Int. Cl.[7] .................................................. H04Q 7/20
(52) U.S. Cl. ........................ 455/452; 455/500; 455/450; 370/468
(58) Field of Search ................................. 455/450, 452, 455/509, 500, 422, 447, 335; 370/342, 441, 209, 468, 433, 465, 338, 435

(56) References Cited

U.S. PATENT DOCUMENTS

| | | | |
|---|---|---|---|
| 4,675,863 A | 6/1987 | Paneth et al. ................ | 370/50 |
| 4,817,089 A | 3/1989 | Paneth et al. ................ | 370/95 |
| 4,912,705 A | 3/1990 | Paneth et al. ................ | 370/95.1 |
| 4,949,395 A | * 8/1990 | Rydbeck ....................... | 370/435 |
| 5,022,024 A | 6/1991 | Paneth et al. ................ | 370/50 |

(List continued on next page.)

FOREIGN PATENT DOCUMENTS

| | | | |
|---|---|---|---|
| EP | 0 526 106 A2 | 2/1993 | |
| EP | 0 682 423 A2 | * 11/1995 | ............ H04J/13/00 |
| EP | 0 682 426 A2 | 11/1995 | |
| EP | 0 719 062 A2 | 6/1996 | |
| WO | WO 96/08934 | 3/1996 | |
| WO | WO 96/37081 | 11/1996 | |
| WO | WO 97/46044 | 4/1997 | |
| WO | WO 97/23073 | 6/1997 | |

OTHER PUBLICATIONS

Melanchuck, et al., "CDPD and Emerging Digital Cellular Systems," *Digest of Papers of COMPCON*, Computer Society Conference 1996, Technologies for the Information Superhighway, Santa Clara, Ca. , No. Conf. 41, pp. 2–8 (Feb. 25, 1996) , XP000628452 Institute of Electrical and Electronic Engineers.

*Primary Examiner*—Dwayne Bost
*Assistant Examiner*—Joy Contee
(74) *Attorney, Agent, or Firm*—Allen, Dyer, Doppelt, Milbrath & Gilchrist, P.A.

(57) ABSTRACT

A technique for transmission of wireless signals across CDMA radio links. Bandwidth is allocated dynamically within a session to specific CDMA subscriber unit based upon data rate determinations. Specifically, a dynamic bandwidth allocation algorithm operates from limits calculated based upon available ports per subscriber, expected user bandwidth, and parallel user bandwidth versus throughput. Provisions for priority service, unbalanced forward and reverse spectrum utilization, voice prioritization, and band switching are also made.

45 Claims, 6 Drawing Sheets

U.S. PATENT DOCUMENTS

| | | | |
|---|---|---|---|
| 5,027,400 A | * 6/1991 | Baji et al. | 380/20 |
| 5,114,375 A | 5/1992 | Wellhausen et al. | 446/246 |
| 5,226,044 A | * 7/1993 | Gupta et al. | 370/435 |
| 5,282,222 A | 1/1994 | Fattouche et al. | 375/1 |
| 5,325,419 A | 6/1994 | Connolly et al. | 379/60 |
| 5,355,374 A | * 10/1994 | Hester et al. | 370/84 |
| 5,412,429 A | 5/1995 | Glover | 348/398 |
| 5,471,463 A | 11/1995 | Hulbert | 370/18 |
| 5,585,850 A | 12/1996 | Schwaller | 348/388 |
| 5,592,470 A | * 1/1997 | Rudrapatna et al. | 370/320 |
| 5,592,471 A | 1/1997 | Briskman | 455/52.3 |
| 5,617,423 A | 4/1997 | Li et al. | 370/426 |
| 5,655,001 A | 8/1997 | Cline et al. | 370/328 |
| 5,657,358 A | 8/1997 | Paneth et al. | 375/356 |
| 5,687,194 A | 11/1997 | Paneth et al. | 375/283 |
| 5,697,059 A | 12/1997 | Carney | 455/34.1 |
| 5,793,744 A | * 8/1998 | Kanerva et al. | 370/209 |
| 5,872,786 A | * 2/1999 | Shobatake | 370/398 |
| 5,881,060 A | * 3/1999 | Morrow et al. | 370/337 |
| 5,896,376 A | 4/1999 | Alperovich et al. | 370/348 |
| 5,956,332 A | * 9/1999 | Rasanen et al. | 370/342 |
| 5,966,374 A | 10/1999 | Rasanen | 370/337 |
| 6,002,690 A | * 12/1999 | Takayama et al. | 370/437 |
| 6,011,800 A | * 1/2000 | Nadgauda et al. | 370/437 |
| 6,081,536 A | * 6/2000 | Gorsuch et al. | 370/468 |
| 6,310,859 B1 | * 10/2001 | Morita et al. | 370/235 |

* cited by examiner

DYNAMIC BANDWIDTH ALLOCATION TO TRANSMIT A WIRELESS PROTOCOL ACROSS A CODE DIVISION MULTIPLE ACCESS (CDMA) RADIO LINK

CROSS REFERENCE TO RELATED APPLICATIONS

This application is a Continuation of pending U.S. application Ser. No. 08/992,760 filed Dec. 17, 1997, now U.S. Pat. No. 6,081,536, entitled "Dynamic Bandwidth Allocation to Transmit a Wireless Protocol Across a Code Division Multiple Access (CDMA) Radio Link," which itself claims the benefit of U.S. Provisional Application No. 60/050,338 filed Jun. 20, 1997 entitled "Dynamic Bandwidth Allocation to Transmit a Wireless ISDN Protocol Across a Code Division Multiple Access (CDMA) Radio Link" and U.S. Provisional Application No. 60/050,277 filed Jun. 20, 1997 entitled "Protocol Conversion and Bandwidth Reduction Technique Providing Multiple nB+D ISDN Basic Rate Interface Links Over a Wireless Code Division Multiple Access Communication System," the entire teachings of all of which are incorporated herein by reference.

BACKGROUND OF THE INVENTION

The increasing use of wireless telephones and personal computers by the general population has led to a corresponding demand for advanced telecommunication services that were once thought to only be meant for use in specialized applications.

For example, in the late 1980's, wireless voice communication such as available with cellular telephony had been the exclusive province of the businessman because of expected high subscriber costs. The same was also true for access to remotely distributed computer networks, whereby until very recently, only business people and large institutions could afford the necessary computers and wireline access equipment.

However, the general population now increasingly wishes to not only have access to networks such as the Internet and private intranets, but also to access such networks in a wireless fashion as well. This is particularly of concern for the users of portable computers, laptop computers, hand-held personal digital assistants and the like who would prefer to access such networks without being tethered to a telephone line.

There still is no widely available satisfactory solution for providing low cost, high speed access to the Internet and other networks using existing wireless networks. This situation is most likely an artifact of several unfortunate circumstances. For example, the typical manner of providing high speed data service in the business environment over the wireline network is not readily adaptable to the voice grade service available in most homes or offices. In addition, such standard high speed data services do not lend themselves well to efficient transmission over standard cellular wireless handsets.

Furthermore, the existing cellular network was originally designed only to deliver voice services. At present, the wireless modulation schemes in use continue their focus on delivering voice information with maximum data rates only in the range of 9.6 kbps being readily available. This is because the cellular switching network in most countries, including the United States, uses analog voice channels having a bandwidth from about 300 to 3600 Hertz. Such a low frequency channel does not lend itself directly to transmitting data at rates of 28.8 kilobits per second (kbps) or even the 56.6 kbps that is now commonly available using inexpensive wire line modems, and which rates are now thought to be the minimum acceptable data rates for Internet access.

Switching networks with higher speed building blocks are just now coming into use in the United States. Although certain wireline networks, called Integrated Services Digital Networks (ISDN), capable of higher speed data access have been known for a number of years, their costs have only been recently reduced to the point where they are attractive to the residential customer, even for wireline service. Although such networks were known at the time that cellular systems were originally deployed, for the most part, there is no provision for providing ISDN-grade data services over cellular network topologies.

ISDN is an inherently circuit switched protocol, and was, therefore, designed to continuously send bits in order to maintain synchronization from end node to end node to maintain a connection. Unfortunately, in wireless environments, access to channels is expensive and there is competition for them; the nature of the medium is such that they are expected to be shared. This is dissimilar to the usual wireline ISDN environment in which channels are not intended to be shared by definition.

SUMMARY OF THE INVENTION

The present invention provides high speed data and voice service over standard wireless connections via an unique integration of ISDN protocols and existing cellular signaling such as is available with Code Division Multiple Access (CDMA) type modulated systems. The present invention achieves high data rates through more efficient allocation of access to the CDMA wireless channels. In particular, a number of subchannels are defined within a standard CDMA channel bandwidth, which is normally necessary to support the ISDN protocol, such as by assigning different codes to each subchannel. The instantaneous bandwidth needs of each on-line subscriber unit are met by dynamically allocating multiple subchannels of the RF carrier on an as needed basis for each session. For example, multiple subchannels are granted during times when the subscriber bandwidth requirements are relatively high, such as when downloading Web pages and released during times when the line content is relatively light, such as when the subscriber is reading a Web page which has been previously downloaded or is performing other tasks.

Subchannel assignment algorithms may be implemented to offer various levels of priority service to particular subscribers. These may be assigned based upon available ports per subscriber, expected user bandwidth, service premium payments, and so on.

In accordance with another aspect of the invention, some portion of the available bandwidth is initially allocated to establish a communication session. Once the session has been established, if a subscriber unit has no data to present for transmission, namely, if the data path remains quiescent for some period of time, the previously assigned bandwidth is deallocated. In addition, it is preferable that not all of the previously assigned bandwidth be deallocated, but rather at least some portion be kept available for use by an in-session subscriber. If the inactivity continues for a further period of time, then even the remaining portion of the bandwidth can be deallocated from the session. A logical session connection at a network layer protocol is still maintained even if no subchannels are assigned.

In a preferred arrangement, a single subchannel is maintained for a predetermined minimum idle time for each network layer connection. This assists with more efficient management of channel setup and tear down.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

FIG. 7 is a high level structured English description of a process performed by the base station to manage bandwidth dynamically according to the invention.

DETAILED DESCRIPTION OF THE INVENTION

Figure 1:
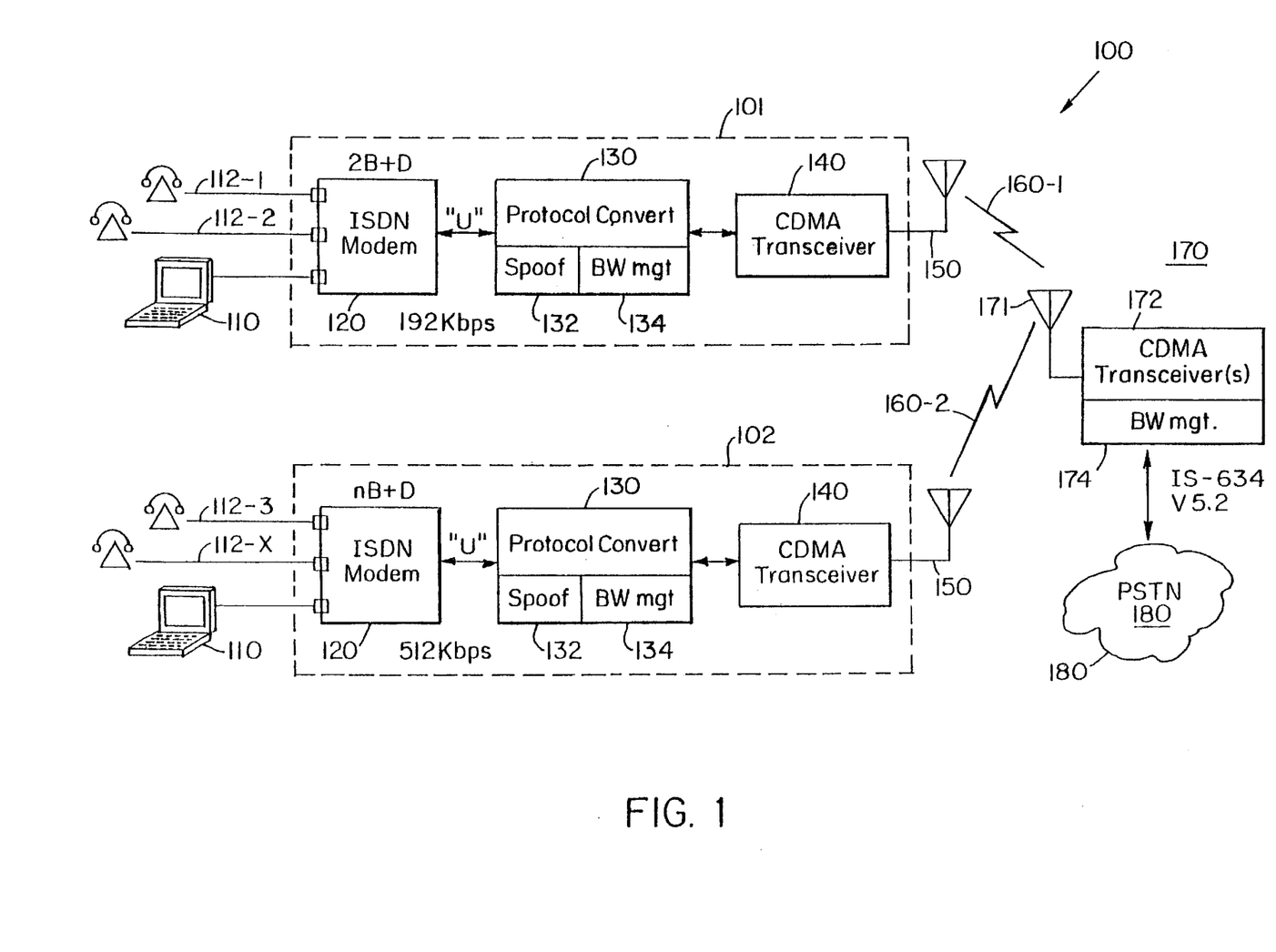
FIG. 1 is a block diagram of a wireless communication system making use of a bandwidth management scheme according to the invention.

Turning attention now to the drawings more particularly, FIG. 1 is a block diagram of a system 100 for providing high speed data and voice service over a wireless connection by seamlessly integrating a digital data protocol such as, for example, Integrated Services Digital Network (ISDN) with a digitally modulated wireless service such as Code Division Multiple Access (CDMA).

The system 100 consists of two different types of components, including subscriber units 101, 102 and base stations 170. Both types of these components 101 and 170 cooperate to provide the functions necessary in order to achieve the desired implementation of the invention. The subscriber unit 101 provides wireless data services to a portable computing device 110 such as a laptop computer, portable computer, personal digital assistant (PDA) or the like. The base station 170 cooperates with the subscriber unit 101 to permit the transmission of data between the portable computing device 110 and other devices such as those connected to the Public Switched Telephone Network (PSTN) 180.

More particularly, data and/or voice services are also provided by the subscriber unit 101 to the portable computer 110 as well as one or more other devices such as telephones 112-1, 112-2 (collectively referred to herein as telephones 112. (The telephones 112 themselves may in turn be connected to other modems and computers which are not shown in FIG. 1). In the usual parlance of ISDN, the portable computer 110 and telephones 112 are referred to as terminal equipment (TE). The subscriber unit 101 provides the functions referred to as a network termination type 1 (NT-1). The illustrated subscriber unit 101 is in particular meant to operate with a so-called basic rate interface (BRI) type ISDN connection that provides two bearer or "B" channels and a single data or "D" channel with the usual designation being 2B+D.

The subscriber unit 101 itself consists of an ISDN modem 120, a device referred to herein as the protocol converter 130 that performs the various functions according to the invention including spoofing 132 and bandwidth management 134, a CDMA transceiver 140, and subscriber unit antenna 150. The various components of the subscriber unit 101 may be realized in discrete devices or as an integrated unit. For example, an existing conventional ISDN modem 120 such as is readily available from any number of manufacturers may be used together with existing CDMA transceivers 140. In this case, the unique functions are provided entirely by the protocol converter 130 which may be sold as a separate device. Alternatively, the ISDN modem 120, protocol converter 130, and CDMA transceiver 140 may be integrated as a complete unit and sold as a single subscriber unit device 101.

The ISDN modem 120 converts data and voice signals between the terminal equipment 110 and 112 to format required by the standard ISDN "U" interface. The U interface is a reference point in ISDN systems that designates a point of the connection between the network termination (NT) and the telephone company.

The protocol converter 130 performs spoofing 132 and basic bandwidth management 134 functions, which will be described in greater detail below. In general, spoofing 132 consists of insuring that the subscriber unit 101 appears to the terminal equipment 110, 112 that is connected to the public switched telephone network 180 on the other side of the base station 170 at all times.

The bandwidth management function 134 is responsible for allocating and deallocating CDMA radio channels 160 as required. Bandwidth management also includes the dynamic management of the bandwidth allocated to a given session by dynamically assigning sub-portions of the CDMA channels 160 in a manner which is more fully described below.

The CDMA transceiver 140 accepts the data from the protocol converter 130 and reformats this data in appropriate form for transmission through a subscriber unit antenna 150 over CDMA radio link 160-1. The CDMA transceiver 140 may operate over only a single 1.25 MHZ radio frequency channel or, alternatively, in a preferred embodiment, may be tunable over multiple allocatable radio frequency channels.

CDMA signal transmissions are then received at the base station and processed by the base station equipment 170. The base station equipment 170 typically consists of multichannel antennas 171, multiple CDMA transceivers 172, and a bandwidth management functionality 174. Bandwidth management controls the allocation of CDMA radio channels 160 and subchannels. The base station 170 then couples the demodulated radio signals to the Public Switch Telephone Network (PSTN) 180 in a manner which is well known in the art. For example, the base station 170 may communicate with the PSTN 180 over any number of different efficient communication protocols such as primary rate ISDN, or other LAPD based protocols such as IS-634 or V5.2.

It should also be understood that data signals travel bidirectionally across the CDMA radio channels 160, i.e., data signals originate at the portable computer 110 are coupled to the PSTN 180, and data signals received from the PSTN 180 are coupled to the portable computer 110.

Other types of subscriber units such as unit 102 may be used to provide higher speed data services. Such subscriber units 102 typically provide a service referred to as nB+D type service that may use a so-called Primary Rate Interface (PRI) type protocol to communicate with the terminal equipment 110, 112. These units provide a higher speed service such as 512 kbps across the U interface. Operation of the protocol converter 130 and CDMA transceiver 140 are similar for the nB+D type subscriber unit 102 as previously described for subscriber unit 101, with the understanding that the number of radio links 160 to support subscriber unit 102 are greater in number or each have a greater bandwidth.

Figure 2:
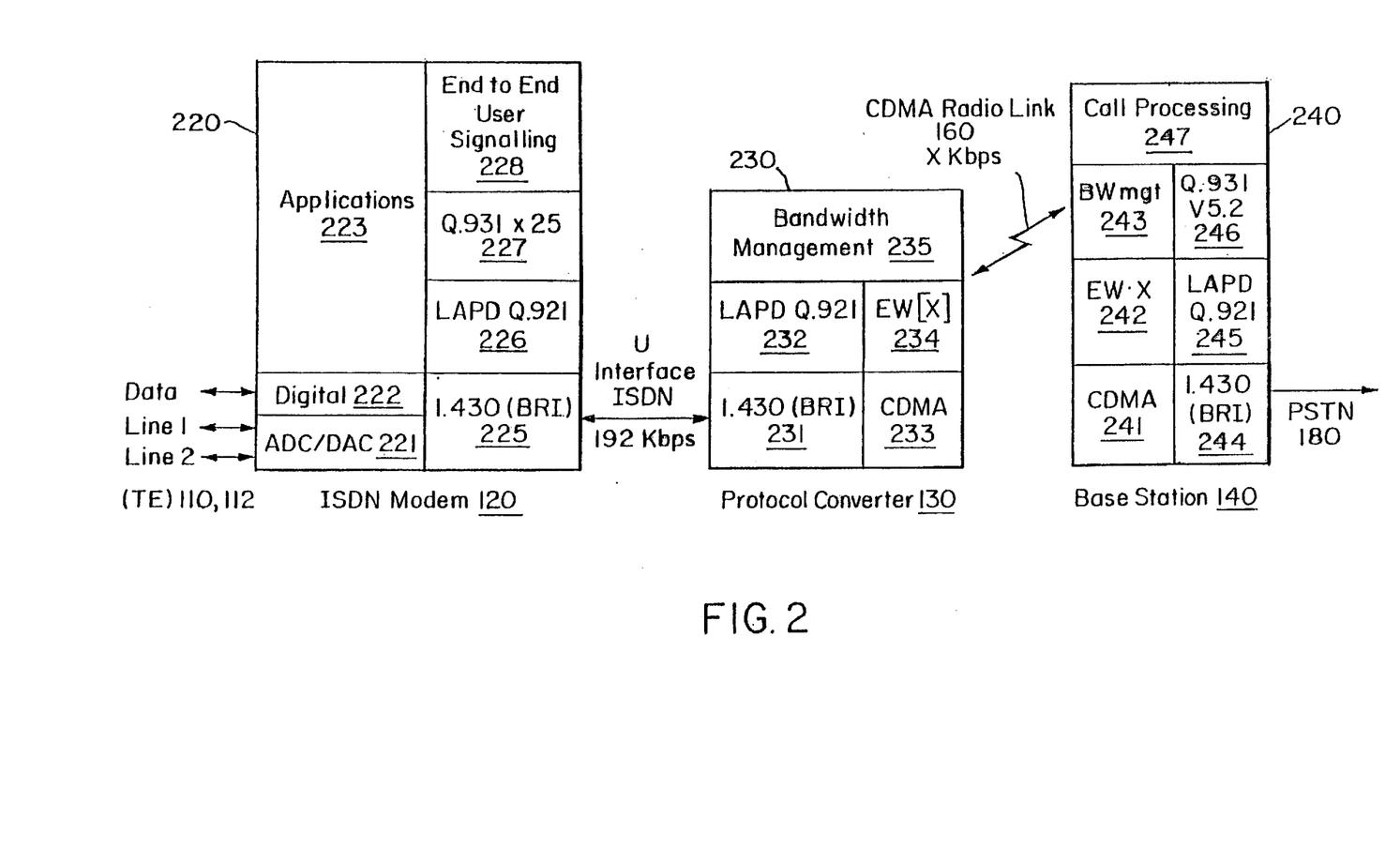
FIG. 2 is an Open System Interconnect (OSI) type layered protocol diagram showing where the bandwidth management scheme is implemented in terms of communication protocols.

Turning attention now to FIG. 2, the invention may be described in the context of a Open Systems Interconnect multilayer protocol diagram. The three protocol stacks 220, 230, and 240 are for the ISDN modem 120, protocol converter 130, and base station 170, respectively.

The protocol stack 220 used by the ISDN modem 120 is conventional for ISDN communications and includes, on the terminal equipment side, the analog to digital conversion (and digital to analog conversion) 221 and digital data formatting 222 at layer one, and an applications layer 223 at layer two. On the U interface side, the protocol functions include Basic Rate Interface (BRI) such as according to standard I.430 at layer one, a LAPD protocol stack at layer two, such as specified by standard Q.921, and higher level network layer protocols such as Q.931 or X.227 and high level end to end signaling 228 required to establish network level sessions between modes.

The lower layers of the protocol stack 220 aggregate two bearer (B) channels to achieve a single 128 kilobits per second (kbps) data rate in a manner which is well known in the art. Similar functionality can be provided in a primary rate interface, such as used by subscriber unit 102, to aggregate multiple B channels to achieve up to 512 kbps data rate over the U interface.

The protocol stack 230 associated with the protocol converter 130 consists of a layer one basic rate interface 231 and a layer two LAPD interface 232 on the U interface side, to match the corresponding layers of the ISDN modem stack 220.

At the next higher layer, usually referred to as the network layer, a bandwidth management functionality 235 spans both the U interface side and the CDMA radio link side of the protocol converter stack 230. On the CDMA radio link side 160, the protocol depends upon the type of CDMA radio communication in use. An efficient wireless protocol referred to herein as EW[x] 234, encapsulates the layer one 231 and layer two 232 ISDN protocol stacks in such a manner that the terminal equipment 110 may be disconnected from one or more CDMA radio channels without interrupting a higher network layer session.

The base station 170 contains the matching CDMA 241 and EW[x] 242 protocols as well as bandwidth management 243. On the PSTN side, the protocols may convert back to basic rate interface 244 and LAPD 245 or may also include higher level network layer protocols as Q.931 or V5.2 246.

Call processing functionality 247 allows the network layer to set up and tear down channels and provide other processing required to support end to end session connections between nodes as is known in the art.

The spoofing function 132 performed by the EW[x] protocol 234 includes the necessary functions to keep the U interface for the ISDN connection properly maintained, even in the absence of a CDMA radio link 160 being available. This is necessary because ISDN, being a protocol originally developed for wire line connections, expects to send a continuous stream of synchronous data bits regardless of whether the terminal equipment at either end actually has any data to transmit. Without the spoofing function 132, radio links 160 of sufficient bandwidth to support at least a 192 kbps data rate would be required throughout the duration of an end to end network layer session, whether or not data is actually presented.

EW[x] 234 therefore involves having the CDMA transceiver 140 loop back these synchronous data bits over the ISDN communication path to spoof the terminal equipment 110, 112 into believing that a sufficiently wide wireless communication link 160 is continuously available. However, only when there is actually data present from the terminal equipment to the wireless transceiver 140 is wireless bandwidth allocated. Therefore, unlike the prior art, the network layer need not allocate the assigned wireless bandwidth for the entirety of the communications session. That is, when data is not being presented upon the terminal equipment to the network equipment, the bandwidth management function 235 deallocates initially assigned radio channel bandwidth 160 and makes it available for another transceiver and another subscriber unit 101.

Figure 3:
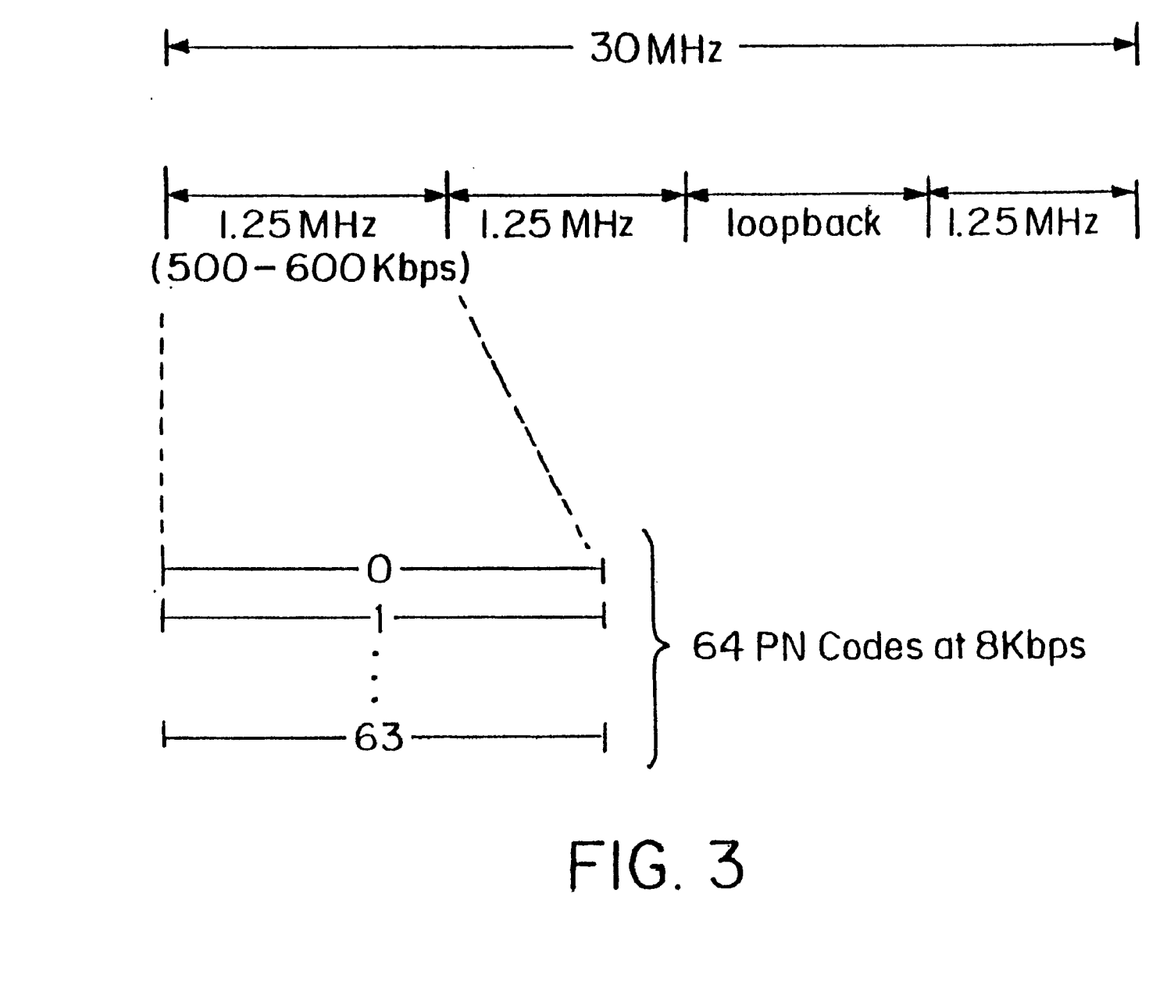
FIG. 3 is a diagram showing how subchannels are assigned within a given radio frequency (RF) channel.

In order to better understand how bandwidth management 235 and 243 accomplish the dynamic allocation of radio bandwidth, turn attention now to FIG. 3. This figure illustrates one possible frequency plan for the wireless links 160 according to the invention. In particular, a typical transceiver 170 can be tuned on command to any 1.25 MHZ channel within a much larger bandwidth, such as up to 30 MHZ. In the case of location in an existing cellular radio frequency bands, these bandwidths are typically made available in the range of from 800 to 900 MHZ. For personal communication systems (PCS) type wireless systems, the bandwidth is typically allocated in the range from about 1.8 to 2.0 GigaHertz (GHz). In addition, there are typically two matching bands active simultaneously, separated by a guard band, such as 80 MHZ; the two matching bands form forward and reverse full duplex link.

Each of the CDMA transceivers, such as transceiver 140 in the subscriber unit 101 and transceivers 172 in the base station 170, are capable of being tuned at any given point in time to a given 1.25 MHZ radio frequency channel. It is generally understood that such 1.25 MHZ radio frequency carrier provides, at best, a total equivalent of about 500 to 600 kbps maximum data rate transmission within acceptable bit error rate limitations.

In the prior art, it was thus generally understood that in order to support an ISDN type like connection which may contain information at a rate of 128 kbps that, at best, only about (500 kbps/128 kbps) or only 3 ISDN subscriber units could be supported at best.

In contrast to this, the present invention subdivides the available approximately 500 to 600 kbps bandwidth into a relatively large number of subchannels. In the illustrated example, the bandwidth is divided into 64 subchannels 300, each providing an 8 kbps data rate. A given subchannel 300 is physically implemented by encoding a transmission with one of a number of different assignable pseudorandom codes. For example, the 64 subchannels 300 may be defined within a single CDMA RF carrier by using a different orthogonal Walsh codes for each defined subchannel 300.

The basic idea behind the invention is to allocate the subchannels 300 only as needed. For example, multiple subchannels 300 are granted during times when a particular ISDN subscriber unit 101 is requesting that large amounts of data be transferred. These subchannels 300 are released during times when the subscriber unit 101 is relatively lightly loaded.

Figure 4:
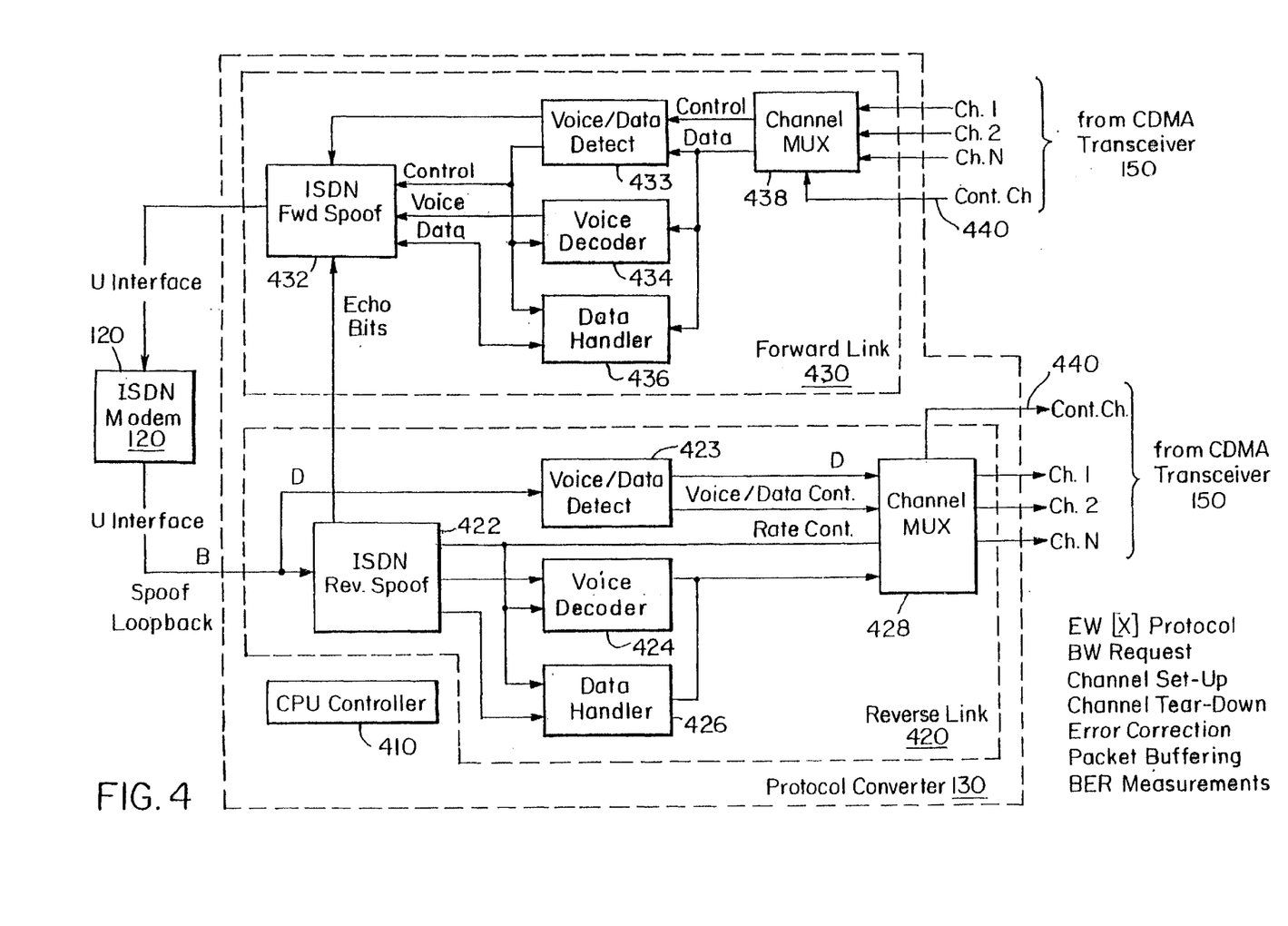
FIG. 4 is a more detailed block diagram of the elements of a subscriber unit.

Before discussing how the subchannels are preferably allocated and deallocated, it will help to understand a typical subscriber unit 101 in greater detail. Turning attention now to FIG. 4, it can be seen that an exemplary protocol converter 130 consists of a microcontroller 410, reverse link processing 420, and forward link processing 430. The reverse link processing 420 further includes ISDN reverse spoofer 422, voice data detector 423, voice decoder 424, data handler 426, and channel multiplexer 428. The forward link processing 430 contains analogous functions operating in the reverse direction, including a channel multiplexer 438, voice data detector 433, voice decoder 434, data handler 436, and ISDN forward spoofer 432.

In operation, the reverse link 420 first accepts channel data from the ISDN modem 120 over the U interface and forwards it to the ISDN reverse spoofer 432. Any repeating, redundant "echo" bits are removed from data received and, once extracted, sent to the forward spoofer 432. The remaining layer three and higher level bits are thus information that needs to be send over a wireless link.

This extracted data is sent to the voice decoder 424 or data handler 426, depending upon the type of data being processed.

Any D channel data from the ISDN modem 120 is sent directly to voice data detection 423 for insertion on the D channel inputs to the channel multiplexer 428. The voice data detection circuit 423 determines the content of the D channels by analyzing commands received on the D channel.

D channel commands may also be interpreted to control a class of wireless services provided. For example, the controller 410 may store a customer parameter table that contains information about the customers desired class of service which may include parameters such as maximum data rate and the like. Appropriate commands are thus sent to the channel multiplexer 428 to request one or more required subchannels 300 over the radio links 160 for communication. Then, depending upon whether the information is voice or data, either the voice decoder 424 or data handler 426 begins feeding data inputs to the channel multiplexer 428.

The channel multiplexer 428 may make further use of control signals provided by the voice data detection circuits 423, depending upon whether the information is voice or data.

In addition, the CPU controller 410, operating in connection with the channel multiplexer 428, assists in providing the necessary implementation of the EW[x] protocol 234 between the subscriber unit 101 and the base station 170. For example, subchannel requests, channel setup, and channel tear down commands are sent via commands placed on the wireless control channel 440. These commands are intercepted by the equivalent functionality in the base station 170 to cause the proper allocation of subchannels 300 to particular network layer sessions.

The data handler 426 provides an estimate of the data rate required to the CPU controller 410 so that appropriate commands can be sent over the control channel 440 to allocate an appropriate number of subchannels. The data handler 426 may also perform packet assembly and buffering of the layer three data into the appropriate format for transmission.

The forward link 430 operates in analogous fashion. In particular, signals are first received from the channels 160 by the channel multiplexer 438. In response to receiving information on the control channels 440, control information is routed to the voice data detection circuit 433. Upon a determination that the received information contains data, the received bits are routed to the data handler 436. Alternatively, the information is voice information, and routed to the voice decoder 434.

Voice and data information are then sent to the ISDN forward spoofer 432 for construction into proper ISDN protocol format. This assembly of information is coordinated with the receipt of echo bits from the ISDN reverse spoofer 422 to maintain the proper expected synchronization on the U interface with the ISDN modem 120.

It can now be seen how a network layer communication session may be maintained even though wireless bandwidth initially allocated for transmission is reassigned to other uses when there is no information to transmit. In particular, the reverse 422 and forward 432 spoofers cooperate to loop back non-information bearing signals, such as flag patterns, sync bits, and other necessary information, so as to spoof the data terminal equipment connected to the ISDN modem 120 into continuing to operate as though the allocated wireless path over the CDMA transceiver 150 is continuously available.

Therefore, unless there is an actual need to transmit information from the terminal equipment being presented to the channel multiplexers 428, or actual information being received from the channel multiplexers 438, the invention may deallocate initially assigned subchannel 300, thus making them available for another subscriber unit 101 of the wireless system 100.

The CPU controller 410 may also perform additional functions to implement the EW[x] protocol 234, including error correction, packet buffering, and bit error rate measurement.

The functions necessary to implement bandwidth management 235 in the subscriber unit 101 are carried out in connection with the EW[x] protocol typically by the CPU controller 410 operating in cooperation with the channel multiplexers 428, 438, and data handlers 420, 436. In general, bandwidth assignments are made for each network layer session based upon measured short term data rate needs. One or more subchannels 300 are then assigned based upon these measurements and other parameters such as amount of data in queue or priority of service as assigned by the service provider. In addition, when a given session is idle, a connection is preferably still maintained end to end, although with a minimum number of, such as a single subchannel being assigned. For example, this single subchannel may eventually be dropped after a predetermined minimum idle time is observed.

Figure 5:
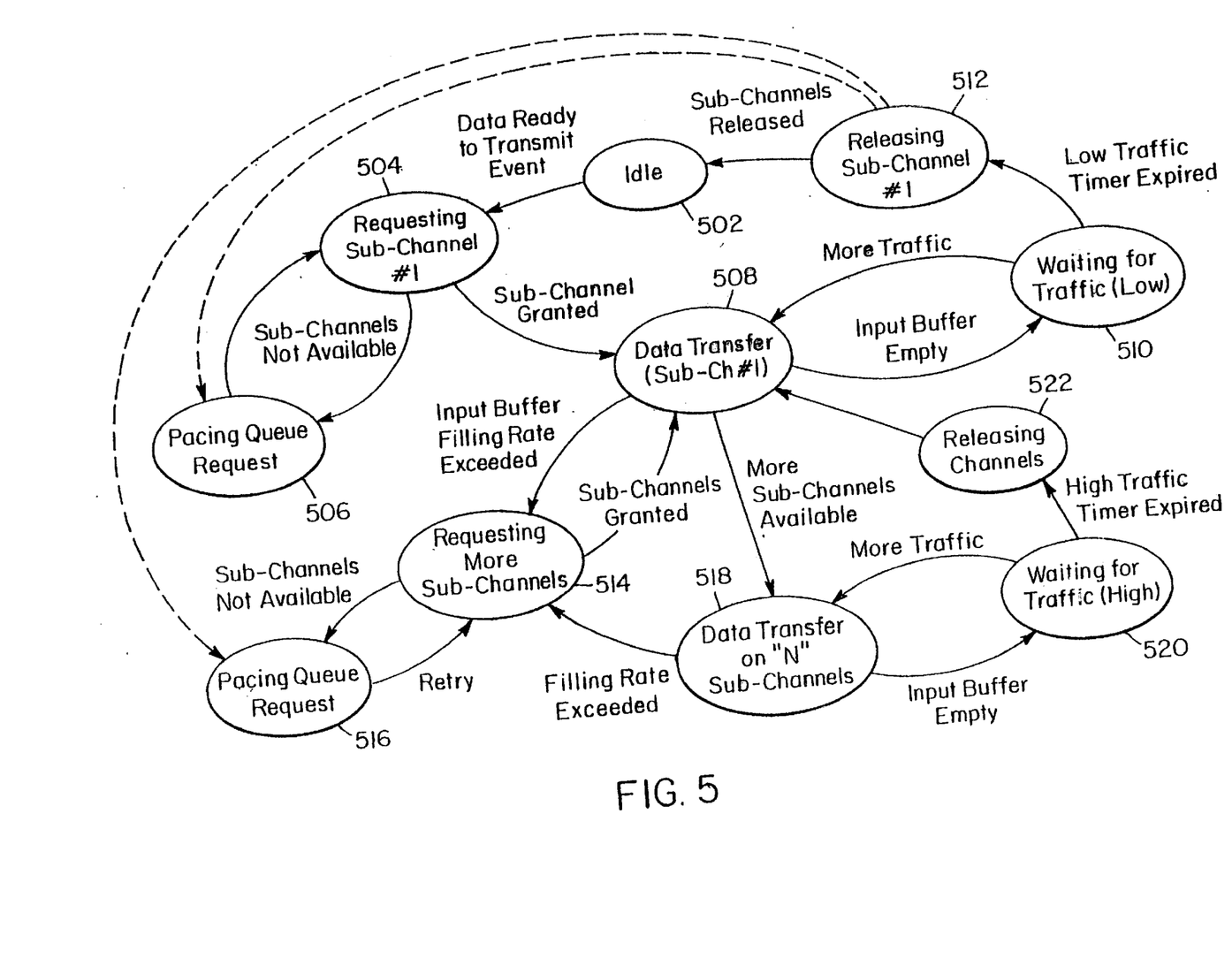
FIG. 5 is a state diagram of the operations performed by a subscriber unit to request and release subchannels dynamically.

FIG. 5 is a detailed view of the process by which a subscriber unit 101 may request subchannel 300 allocations from the base station 170 according to the invention. In a first state 502, the process is in an idle state. At some point, data becomes ready to transmit and state 504 is entered, where the fact that data is ready to be transmitted may be detected by an input data buffer in the data handler 426 indicated that there is data ready.

In state 504, a request is made, such as via a control channel 440 for the allocation of a subchannel to subscriber unit 101. If a subchannel is not immediately available, a pacing state 506 may be entered in which the subscriber unit simply waits and queues its request for a subchannel to be assigned.

Eventually, a subchannel 300 is granted by the base station and the process continues to state 508. In this state, data transfer may then begin using the single assigned subchannel. The process will continue in this state as long as the single subchannel 300 is sufficient for maintaining the required data transfer and/or is being utilized. However, if the input buffer should become empty, such as notified by the data handler 426, then the process will proceed to a state 510. In this state 510, the subchannel will remain assigned in the event that data traffic again resumes. In this case, such as when the input buffer begins to once again become full and data is again ready to transmit, then the process returns to state 508. However, from state 510 should a low traffic timer expire, then the process proceeds to state 512 in which the single subchannel 300 is released. The process then returns to the idle state 502. In state 512, if a queue request is pending from states 506 or 516, the subchannel is used to satisfy such request instead of releasing it.

Returning to state 508, if instead the contents of the input buffer are beginning to fill at a rate which exceeds a predetermined threshold indicating that the single subchannel 300 is insufficient to maintain the necessary data flow, then a state 514 is entered in which more subchannels 300 are requested. A subchannel request message is again sent over the control channel 440 or through a subchannel 300 already allocated. If additional subchannels 300 are not immediately available, then a pacing state 516 may be entered and the request may be retried by returning to state 514 and 516 as required. Eventually, an additional subchannel will be granted and processing can return to state 508.

With the additional subchannels being now available, the processing continues to state 518 where data transfer may be made on a multiple N of the subchannels. This may be done at the same time through a channel bonding function or other mechanism for allocating the incoming data among the N subchannels. As the input buffer contents reduced below an empty threshold, then a waiting state 520 may be entered.

If, however, a buffer filling rate is exceeded, then state 514 may be entered in which more subchannels 300 are again requested.

In state 520, if a high traffic timer has expired, then one or more of the additional subchannels are released in state 522 and the process returns to state 508.

Figure 6:
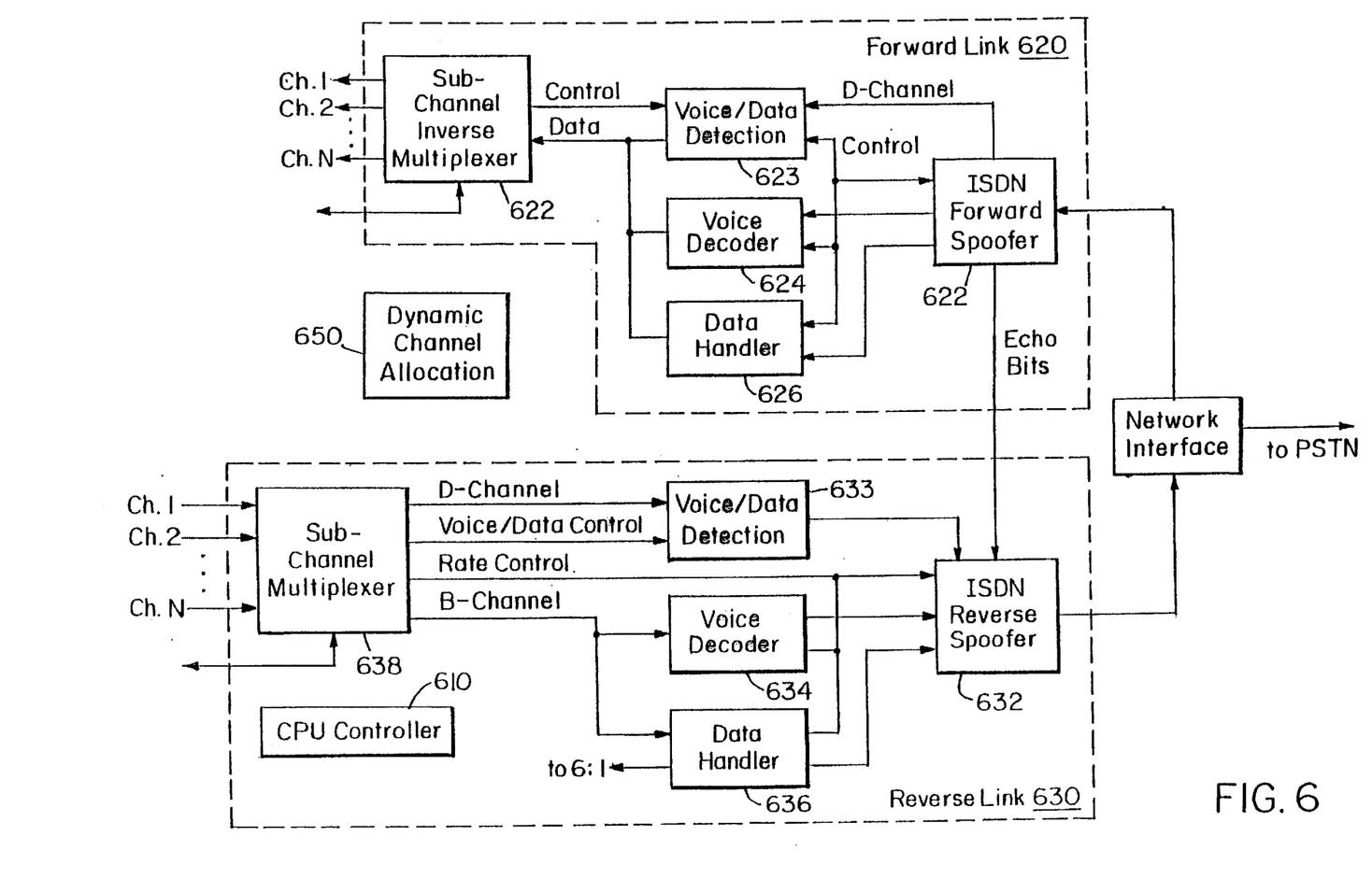
FIG. 6 is a block diagram of a portion of a base station unit necessary to service each subscriber unit.

FIG. 6 is a block diagram of the components of the base station equipment 170 of the system 100. These components perform analogous functions to those as already described in detail in FIG. 4 for the subscriber unit 101. It should be understood that a forward link 620 and reverse link 630 are required for each subscriber unit 101 or 102 needing to be supported by the base station 170.

The base station forward link 620 functions analogously to the reverse link 420 in the subscriber unit 100, including a subchannel inverse multiplexer 622, voice data detection 623, voice decoder 624, data handler 626, and ISDN spoofer 622, with the understanding that the data is traveling in the opposite direction in the base station 170. Similarly, the base station reverse link 630 includes components analogous to those in the subscriber forward link 430, including an ISDN spoofer 632, voice data detection 633, voice decoder 634, data handler 636, and subchannel multiplexer 638. The base station 170 also requires a CPU controller 610.

One difference between the operation of the base station 170 and the subscriber unit 101 is in the implementation of the bandwidth management functionality 243. This may be implemented in the CPU controller 610 or in another process in the base station 170.

A high level description of a software process performed by dynamic channel allocation portion 650 of the bandwidth management 243 is contained in FIG. 7. This process includes a main program 710, which is continuously executed, and includes processing port requests, processing bandwidth release, and processing bandwidth requests, and then locating and tearing down unused subchannels.

The processing of port requests is more particularly detailed in a code module 720. These include upon receiving a port request, and reserving a subchannel for the new connection, preferably-chosen from the least utilized section of the radio frequency bandwidth. Once the reservation is made, an RF channel frequency and code assignment are returned to the subscriber unit 101 and a table of subchannel allocations is updated. Otherwise, if subchannels are not available, then the port request is added to a queue of port requests. An expected waiting time may be estimated upon the number of pending port requests and priorities, and an appropriate wait message can be returned to the requesting subscriber unit 101.

In a bandwidth release module 730, the channel bonding function executing in the multiplexer 622 in the forward link is notified of the need to release a subchannel. The frequency and code are then returned to an available pool of subchannels and a radio record is updated.

The following bandwidth request module 740 may include selecting the request having the highest priority with lowest bandwidth utilization. Next, a list of available subchannels is analyzed for determining the greatest available number. Finally, subchannels are assigned based upon need, priority, and availability. A channel bandwidth bonding function is notified within the subchannel multiplexer 622 and the radio record which maintains which subchannels are assigned to which connections is updated.

In the bandwidth on demand algorithm, probability theory may typically be employed to manage the number of connections or available ports, and the spectrum needed to maintain expected throughput size and frequency of subchannel assignments. There may also be provisions for priority service based upon subscribers who have paid a premium for their service.

It should be understood, for example, that in the case of a supporting 128 kbps ISDN subscriber unit 101 that even more than 16×8 kbps subchannels may be allocated at a given time. In particular, one may allow a larger number, such as 20 subchannels, to be allocated to compensate for delay and reaction in assigning subchannels. This also permits dealing with bursts of data in a more efficient fashion such as typically experienced during the downloading of Web pages.

In addition, voice traffic may be prioritized as against data traffic. For example, if a voice call is detected, at least one subchannel 300 may be active at all times and allocated exclusively to the voice transfer. In that way, voice calls blocking probability will be minimized.

Equivalents

While this invention has been particularly shown and described with references to preferred embodiments thereof, it will be understood by those skilled in the art that various changes in form and details may be made therein without departing from the spirit and scope of the invention as defined by the appended claims.

For example, instead of ISDN, other wireline digital protocols may be encapsulated by the EW[x] protocol, such as XDSL, Ethernet, and X.25, and therefore may advantageously use the dynamic wireless subchannel assignment scheme described herein.

Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. For use with a cellular digital communication network having a base station and a plurality of subscriber units served thereby, said cellular digital communications network including a control channel by way of which digital signal transmission channels are assignable for communication sessions for said subscriber units, a method of allocating bandwidth to said subscriber units for said digital signal transmission channels comprising the steps of:
   a) in response to a subscriber unit's request for a digital signal transmission channel, allocating a portion of said available bandwidth for use by said subscriber unit for said digital signal transmission channel during a communication session; and
   b) in the absence of a presentation of digital communication signals by said subscriber unit for a prescribed period of time during said communication session, deallocating said portion of said available bandwidth from use by said subscriber unit while maintaining the appearance of a continuous connection for said communication session.

2. For use with a cellular digital communication network having a base station and a plurality of subscriber units served thereby, said cellular digital communications network including a control channel by way of which digital signal transmission channels are assignable for communication sessions for said subscriber units, a method of allocating bandwidth to said subscriber units for said digital signal transmission channels comprising the steps of:
   a) in response to a subscriber unit's need to transmit digital communication signals, allocating a portion of said available bandwidth that is selected to the extent possible for meeting said subscriber unit's need, for use by said subscriber unit during a communication session; and
   b) in the absence of a presentation of digital communication signals by said subscriber unit for a prescribed period of time during said communication session, deallocating a prescribed portion of said selected portion of said available bandwidth from said subscriber unit and, instead making said prescribed portion of said selected portion of said available bandwidth available for use by another subscriber unit.

3. A method for supporting communication over a wireless media comprising the steps of:
   detecting a request by a subscriber unit to transmit data information;
   allocating a portion of available bandwidth for use by the requesting subscriber unit to establish a communication session for transmitting the data information;
   detecting a non-use of wireless bandwidth assigned to the subscriber unit and deallocating a portion of assigned bandwidth while a still assigned portion of wireless bandwidth is used to support an established communication session;
   maintaining a communication session for servicing future requests by the subscriber unit to transmit information;
   detecting a duration without a request to transmit information and deallocating the still assigned portion of wireless bandwidth from the subscriber unit such that a corresponding communication session is terminated; and
   spoofing a subscriber unit so it appears that a communication session is still active even though a communication session has been terminated.

4. A method for supporting communication over a wireless media comprising the steps of:
   detecting a request by a subscriber unit to transmit data information;
   allocating a portion of available bandwidth for use by the requesting subscriber unit to establish a communication session for transmitting the data information;
   detecting a non-use of wireless bandwidth assigned to the subscriber unit and deallocating a portion of assigned bandwidth while a still assigned portion of wireless bandwidth is used to support an established communication session;
   maintaining a communication session for servicing future requests by the subscriber unit to transmit information; and
   spoofing a subscriber unit so it appears that link maintenance information is transmitted continuously over allocated bandwidth even though no link maintenance information is being transmitted over the allocated bandwidth of a communication session.

5. A method as in claim 4, wherein a portion of bandwith is reallocated to a requesting subscriber unit for transmitting information.

6. A method for supporting communication over a CDMA (Code Division Multiple Access) communication system, the method comprising the steps of:
   maintaining a wireless connection between a subscriber unit and a base station, the connection being at least part of an overall link between a terminal device and a network; and
   spoofing the terminal device so that the subscriber unit appears to be connected to the network.

7. A method as in claim 6, wherein the connection is an idle connection in which no subchannels are allocated for data transfers between the terminal device and the base station.

8. A method as in claim 6, wherein the subscriber unit spoofs the terminal device into believing that enough bandwidth is allocated to support a predetermined data rate whether or not data is actually presented for a data transfer.

9. A method as in claim 6 further comprising:
   allocating at least one subchannel for a data transfer between the terminal device and the network when the subscriber unit receives data from the terminal device to transfer to the base station.

10. A method as in claim 9 further comprising:
    from the subscriber unit, transmitting a message to the base station requesting allocation of the at least one subchannel to support a data transfer.

11. A method for supporting data transfers in a CDMA (Code Division Multiple Access) communication system, the method comprising the steps of:
    maintaining an idle connection without an allocation of subchannels to support data payload transfers between a subscriber unit and a base station of the communication system;
    monitoring an input buffer at the subscriber unit for data that is to be transmitted to the base station;
    detecting a request by the subscriber unit for the allocation of wireless bandwidth to transmit data; and
    initially allocating at least one subchannel to the subscriber unit to begin a data transfer.

12. A method as in claim 11 further comprising:
    monitoring a status of the input buffer and an amount of data therein, at least part of which is transmitted over the at least one subchannel;

requesting an allocation of additional subchannels to support a higher rate transfer of data from the subscriber unit to the base station; and allocating more subchannels to the subscriber unit in addition to the at least one subchannel.

13. A method as in claim 12 further comprising:

detecting that the input buffer becomes empty; and maintaining the at least one subchannel allocated to the subscriber unit.

14. A method as in claim 13 further comprising:

detecting that the input buffer is empty for a predetermined period of time and that there are no data transfers on the at least one subchannel; and deallocating the at least one subchannel from use by the subscriber unit.

15. A method as in claim 12 further comprising:

detecting that the input buffer is filling at a rate which exceeds a predetermined threshold; and requesting an allocation of additional subchannels.

16. A method as in claim 15 further comprising:

if no subchannels are available, entering a pacing state to request additional subchannels.

17. A method for supporting communication over a wireless media comprising the steps of:

detecting a request by a subscriber unit to transmit data information;

allocating a portion of available bandwidth for use by the requesting subscriber unit to establish a communication session for transmitting the data information;

detecting a non-use of wireless bandwidth assigned to the subscriber unit for supporting data transfers and deallocating the assigned bandwidth from the the subscriber unit; and maintaining an idle connection without an allocation of subchannels to support data transfers from the subscriber unit.

18. A method as in claim 17, wherein the communication session is a network layer session.

19. A method as in claim 17, wherein the available bandwidth is allocated to multiple subscriber units, each of which generates independent requests to transmit information.

20. A method as in claim 17, wherein data at a subscriber unit to be transmitted over a communication session accumulates in a buffer and bandwidth is allocated for use by a subscriber unit after the buffer is filled with a predetermined amount of data.

21. A method as in claim 17, wherein requests to transmit information from multiple subscriber units are stored in a queue, where an ordering of requests in the queue is used as a factor in determining an allocation of bandwidth to subscriber units.

22. A method as in claim 17, further comprising the step of:

detecting a duration without a request to transmit data information and terminating the idle connection such that a corresponding communication session is terminated.

23. A method as in claim 22, further comprising the step of:

after a communication session has been terminated, detecting a request by the subscriber unit to transmit information again; and re-allocating a single subchannel for use by the subscriber unit to re-establish a communication session for transmitting information.

24. A method as in claim 22 further comprising the step of:

spoofing a subscriber unit so it appears that a communication session is still active even though a communication session has been terminated.

25. A method as in claim 17, wherein the step of allocating a portion of available bandwidth includes the step of:

dividing an available wireless bandwidth into multiple code division multiple access (CDMA) channels that are assigned for use by subscriber units requesting to transmit information.

26. A method as in claim 25, wherein channels are allocated based on a need to transmit data.

27. A method as in claim 17 further comprising the step of:

estimating a wait time before a subscriber unit can be allocated bandwidth for transmitting information over an established communication session.

28. A method as in claim 27 further comprising the step of:

notifying a requesting subscriber unit of the estimated wait time.

29. A method as in claim 17 further comprising the step of:

spoofing a subscriber unit so it appears that link maintenance information is transmitted continuously over allocated bandwidth even though no link maintenance information is being transmitted over the allocated bandwidth of a communication session.

30. A method as in claim 29, wherein a portion of bandwidth is reallocated to a requesting subscriber unit for transmitting information.

31. A method for supporting communication over a wireless media comprising the steps of:

after allocating a portion of available bandwidth for use by a requesting subscriber unit to establish a communication session for transmitting information, detecting a non-use of wireless bandwidth assigned to the subscriber unit and deallocating a portion of assigned bandwidth while a still assigned portion of wireless bandwidth is used to maintain an established communication session; and spoofing a subscriber unit so it appears that information is transmitted continuously over allocated bandwidth.

32. A method as in claim 31 further comprising the step of:

spoofing a subscriber unit so it appears that link maintenance information is transmitted continuously over allocated bandwidth even though the link maintenance information is not being transmitted over the allocated bandwidth of a conmmunication session.

33. A method as in claim 31 further comprising the step of:

maintaining a communication session for servicing future requests by the subscriber unit to transmit information.

34. A method as in claim 31, wherein the communication session is a network layer session.

35. A method as in claim 31, wherein the step of allocating a portion of available bandwidth includes the step of:

dividing an available wireless bandwidth into multiple code division multiple access (CDMA) channels that are assigned for use by subscriber units requesting to transmit information.

36. A method as in claim 31, wherein channels are allocated based on a need to transmit data.

37. A method as in claim 31, wherein the available bandwidth is allocated to multiple subscriber units, each of which generates independent requests to transmit information.

38. A method as in claim 31, wherein data at a subscriber unit to be transmitted over a communication session accumulates in a buffer and bandwidth is allocated for use to a subscriber unit after the buffer is filled with a predetermined amount of data.

39. A method as in claim 31, wherein requests to transmit information from multiple subscriber units are stored in a queue, where an ordering of requests in the queue is used as a factor in determining an allocation of bandwidth to subscriber units.

40. A method as in claim 31 further comprising the step of:

estimating a wait time before a subscriber unit can be allocated bandwidth for transmitting information over an established communication session.

41. A method as in claim 40 further comprising the step of:

notifying a requesting subscriber unit of the estimated wait time.

42. A method as in claim 31 further comprising the step of:

detecting a duration without a request to transmit information and deallocating the still assigned portion of wireless bandwidth from the subscriber unit such that a corresponding communication session is terminated.

43. A method as in claim 42 further comprising the step of:

after a communication session has been terminated, detecting a request by the subscriber unit to transmit information again; and re-allocating a portion of available bandwidth for use by the subscriber unit to re-establish a communication session for transmitting information.

44. A method as in claim 42 further comprising the step of:

spoofing a subscriber unit so it appears that a communication session is still active even though no bandwidth is assigned for transmitting information in a communication session.

45. A method as in claim 44, wherein a portion of bandwidth is reallocated to a requesting subscriber unit for transmitting information.

\* \* \* \* \*

UNITED STATES PATENT AND TRADEMARK OFFICE
CERTIFICATE OF CORRECTION

PATENT NO. : 6,526,281 B1  
DATED : February 25, 2003  
INVENTOR(S) : Thomas E. Gorsuch and Carlo Amalfitano It is certified that error appears in the above-identified patent and that said Letters Patent is hereby corrected as shown below:

Title page,
Item [57], ABSTRACT,
Line 3, delete "unit" insert -- units --
After "ABSTRACT," delete: "45 Claims, 6 Drawing Sheets" insert -- 45 Claims, 7 Drawing Sheets --

Drawings,
Following Fig 6, insert: FIG. 7 as shown below:

```
MAIN:
    DO Always
        Process Port Request
        Process Bandwidth Release            } 710
        Process Bandwidth Requests
        Locate and tear down unused sub-channels
    ENDDO PORT REQUEST:
    Make reservation in least utilized sub-band
        Reservation decision based on % of available Sub-Channels to
        assign (Based on parallel user BW vs. throughput efficiency)
    IF reservation was made
        Send frequency and code assignment
        Update allocations                    } 720
    ELSE
        Add port request to port queue
        Calculate expected wait time
        Send wait message to user
    ENDIF BANDWIDTH RELEASE:
    Notify channel-bonding function
    Return frequency and code to available pool } 730
    Update radio record BANDWIDTH REQUEST:
    Select highest priority with lowest bandwidth utilization,
        including need-allocation gap
    Check other sub-bands for greatest available sub channels
        (Switch sub-bands if difference in sub-band space   } 740
        exceeds payback threshold)
    Assign sub channels based on need, priority, availability
    Notify channel bonding function
    Update radio record
```

FIG. 7

Column 6,
Line 27, delete "bands" insert -- band --
Line 57, delete "using a different" insert -- using different --

Column 7,
Line 18, delete "be send over" insert -- be sent over --

UNITED STATES PATENT AND TRADEMARK OFFICE
CERTIFICATE OF CORRECTION

PATENT NO. : 6,526,281 B1
DATED : February 25, 2003
INVENTOR(S) : Thomas E. Gorsuch and Carlo Amalfitano It is certified that error appears in the above-identified patent and that said Letters Patent is hereby corrected as shown below:

Column 9,
Line 31, delete "reduced" insert -- reduce --

Column 12,
Line 21, delete "bandwith" insert -- bandwidth --

Column 13,
Line 33, delete "the the subscriber" insert -- the subscriber --

Column 14,
Line 53, delete "conmmunication" insert -- communication --

Signed and Sealed this

Ninth Day of September, 2003

JAMES E. ROGAN
*Director of the United States Patent and Trademark Office*